Smith & Joithe.
Crank Motion.
No. 104,367. Patented June 14, 1870.

United States Patent Office.

JOHN SMITH AND GODFREY JOITHE, OF NEWARK, NEW JERSEY.

Letters Patent No. 104,367, dated June 14, 1870.

IMPROVEMENT IN CRANK-MOTION FOR ENGINES.

The Schedule referred to in these Letters Patent and making part of the same.

*To all whom it may concern:*

Be it known that we, JOHN SMITH and GODFREY JOITHE, of Newark, in the county of Essex and State of New Jersey, have invented a new and improved Crank-Motion for Engines; and we do hereby declare that the following is a full, clear, and exact description thereof, which will enable others skilled in the art to make and use the same, reference being had to the accompanying drawing forming part of this specification, in which—

Similar letters of reference indicate corresponding parts.

Figure 1:
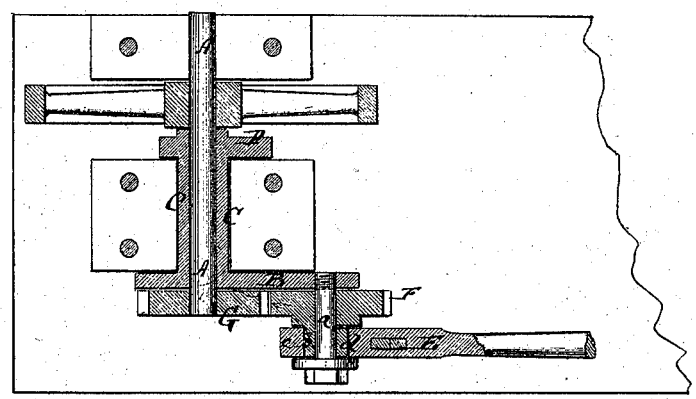
Figure 1 represents a horizontal section of our improved crank-motion
Figure 2:
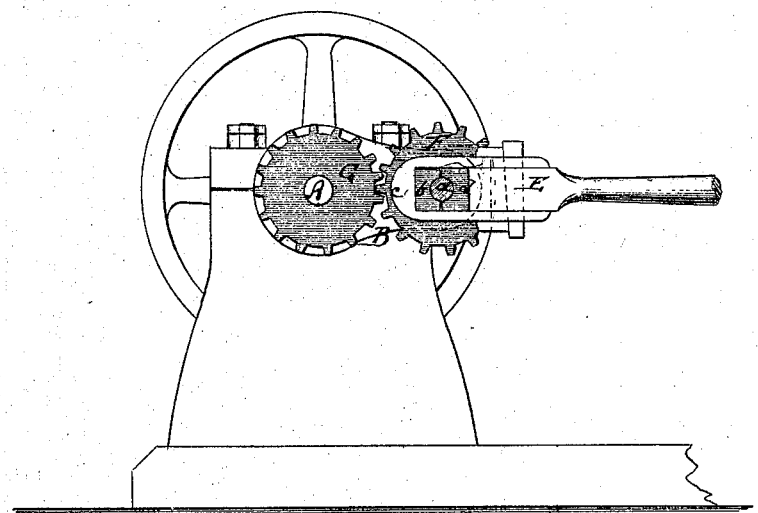
Figure 2 is a front elevation, partly in section, of the same.

This invention relates to certain improvements in that kind of crank-motions in which, by the application of two gear-wheels, the motion of the crank-shaft is doubled.

The invention consists in mounting the crank upon a sleeve, which turns loose on the crank-shaft, and which carries a cam for setting the valve. The sleeve, cam, and crank make but one revolution to two of the shaft, and the valve is therefore set to produce one rotation of the crank, whose shaft meanwhile turns twice.

The invention consists also in the use of a novel connection for the box of the outer gear-wheel with the connecting-rod, to make said wheel turn with the rod.

A, in the drawing, represents the shaft, which is to be revolved by the crank B.

The crank is mounted upon a tube, C, which is fitted loose around the shaft A, and which carries the eccentric D for operating the valve, by which the motion of the crank is regulated.

E is the connecting-rod for working the crank.

The end of this rod is connected with a toothed-wheel, F, which is hung on the end of the crank.

The wheel F is, by a pin, *a*, pivoted to the end of the crank, and carries one-half of a square projecting box, *b*. This box is fitted through the opening formed by a strap, *c*, in the end of the rod E, the other half *d* of the box being put into the same opening to allow adjustment of the strap.

By means of the box *b d* the wheel will be prevented from turning in the rod, while the pin *a* allows it to turn on the crank.

Upon the shaft A is mounted a pinion, G, which meshes into the teeth of the wheel F, receiving, by the rotation of the crank and wheel F, two revolutions during every one of the crank. The latter, however, serves to impart but one rotation to the cam D, during every two of the shaft A, and the said cam will, therefore, regulate the motion of the piston in the same manner in which it would do so were the gearing F G not employed.

Having thus described our invention,

We claim as new and desire to secure by Letters Patent—

1. The sleeve C, cam D, and crank B, in combination with the shaft A and toothed-wheels F G, all arranged to operate substantially as herein shown and described.

2. The block *b d*, on the toothed wheel F, in combination with the pin *a*, crank B, and connecting-rod E, all arranged as set forth.

The above specification of our invention signed by us this 25th day of April, 1870.

JOHN SMITH.
GODFREY JOITHE.

Witnesses:
GEO. W. MABEE,
JOHN DAVIS.